US009052489B2

(12) United States Patent
Ray et al.

(10) Patent No.: US 9,052,489 B2
(45) Date of Patent: Jun. 9, 2015

(54) FIBER SHELF BREAK-OUT PLATE

(71) Applicant: All Systems Broadband, Inc., Livermore, CA (US)

(72) Inventors: Craig Dwayne Ray, Fuquay-Varina, NC (US); Timothy W. Dexter, Raleigh, NC (US); Sean A. Fernandez, Brentwood, CA (US)

(73) Assignee: All Systems Broadband, Inc., Livermore, CA (US)

( * ) Notice: Subject to any disclaimer, the term of this patent is extended or adjusted under 35 U.S.C. 154(b) by 80 days.

(21) Appl. No.: 13/762,849

(22) Filed: Feb. 8, 2013

(65) Prior Publication Data

US 2014/0226944 A1   Aug. 14, 2014

(51) Int. Cl.
*G02B 6/00* (2006.01)
*G02B 6/255* (2006.01)
*G02B 6/44* (2006.01)
G02B 6/38 (2006.01)

(52) U.S. Cl.
CPC .......... *G02B 6/4453* (2013.01); *Y10T 29/49826* (2015.01); *G02B 6/4454* (2013.01); *G02B 6/4452* (2013.01); *G02B 6/3897* (2013.01)

(58) Field of Classification Search
CPC .. G02B 6/4452; G02B 6/3897; G02B 6/4453; G02B 6/4454
USPC .......... 385/75, 76, 95, 97, 134–136, 139, 147
See application file for complete search history.

(56) References Cited

U.S. PATENT DOCUMENTS

| 5,572,400 | A | 11/1996 | Roesner et al. | |
|---|---|---|---|---|
| 7,437,048 | B2 | 10/2008 | Farrell et al. | |
| 7,519,259 | B2 | 4/2009 | Smith et al. | |
| 8,155,494 | B2 | 4/2012 | Krampotich et al. | |
| 2007/0274659 | A1* | 11/2007 | Kaplan | 385/134 |
| 2010/0108347 | A1* | 5/2010 | Korcz et al. | 174/58 |
| 2010/0316346 | A1* | 12/2010 | Krampotich et al. | 385/135 |
| 2011/0235985 | A1 | 9/2011 | Cote et al. | |
| 2011/0255836 | A1 | 10/2011 | Krampotich et al. | |
| 2011/0268404 | A1 | 11/2011 | Cote et al. | |
| 2011/0268405 | A1 | 11/2011 | Cote et al. | |
| 2011/0299822 | A1 | 12/2011 | Barry et al. | |
| 2012/0062086 | A1* | 3/2012 | Garza et al. | 312/236 |
| 2013/0236150 | A1* | 9/2013 | Kopf et al. | 385/135 |

\* cited by examiner

*Primary Examiner* — Kaveh Kianni
*Assistant Examiner* — Hung Lam
(74) *Attorney, Agent, or Firm* — Murphy, Bilak & Homiller, PLLC

(57) ABSTRACT

Enclosures for supporting fiber optic hardware or managing fiber optic cables are disclosed. An example enclosure includes a bulkhead panel extending outward from and extending across a surface of the enclosure. The bulkhead panel includes at least two mounting flange portions rigidly attached to or integrally formed with the floor, each mounting flange comprising openings adapted to receive a bulkhead adapter plate fastener for securing a bulkhead adapter plate. The bulkhead further includes a knock-out panel portion interposed between and integrally formed with two of the mounting flange portions. This knock-out panel portion is joined to (i) the surface via one or more frangible web members, or (ii) to each of the two mounting flange portions with one or more frangible web members, or (iii) both, where the one or more frangible web members are dimensioned to permit removal of the knock-out panel portion by an installer-supplied force or blow.

14 Claims, 8 Drawing Sheets

FIBER SHELF BREAK-OUT PLATE

TECHNICAL FIELD

This application generally relates to enclosures for fiber optic hardware, and more particularly relates to enclosures having configurable adapter plates for securing fiber optic connector hardware.

BACKGROUND

Today's communication networks provide information transport of voice, video and data to both residential and commercial customers with more and more of those customers being connected by fiber optic cables. Current network designs differ among carriers, or service providers, and are influenced by such variables as legacy equipment and architectures, past and present infrastructure investments and network types. These network types include the Gigabit Passive Optical Network (GPON), the Ethernet Passive Optical Network (EPON) and the Hybrid Fiber-Coaxial (HFC) networks, to name just a few.

A fiber optic cable (or "fiber bundle") includes a number of individual optical fibers, each of which may be used to transmit significant quantities of information. Some fiber optic network designs include the use of passive components such as optical splitters and wavelength-division multiplexing (WDM) filters as a way of creating and deploying a more cost effective and efficient access network.

Telecommunications equipment racks often include sliding support shelves or drawers for housing and organizing optical hardware and optical fiber cables. These shelves are designed to protect the optical equipment and optical fiber cables, but should also be designed to provide convenient access to the optical components while keeping the components organized.

Some of these support shelves include one or more bulkhead adapter panels, which facilitate connections between various optical components. The adapter plates, which are typically secured to mounting flanges may have several features (e.g., openings) to receiver and organize fiber optic connectors, and are often position within a storage shelf so as to segregate components and cables into two or more sections. These adapter panels are often removable and replaceable, so that adapter panels customized for a particular application may be installed. Typically, one or more "blank" adapter plates, i.e., adapter plates having no openings for receiving optical fiber connectors, are installed when there is no need for their connector attachment features.

SUMMARY

Embodiments of the present invention include enclosures for supporting fiber optic hardware or managing fiber optic cables, or both, as well as techniques for constructing such enclosures. One example includes a base having four edges, the four edges including opposing first and second edges spaced apart in a first direction and opposing third and fourth edges spaced apart in a second direction, and further having a surface extending between the first and second edges in the first direction and between the third and fourth edges in the second direction. A bulkhead panel extends outward from the surface and extends across the surface in the second direction. The bulkhead panel includes at least two mounting flange portions rigidly attached to or integrally formed with the surface, each mounting flange comprising one or more openings adapted to receive a bulkhead adapter plate fastener for securing a bulkhead adapter plate to the mounting flange. The bulkhead further includes a knock-out panel portion interposed between two of the mounting flange portions. This knock-out panel portion is joined to (i) the surface via one or more frangible web members, or (ii) to each of the two mounting flange portions with one or more frangible web members, or (iii) both, where the one or more frangible web members are dimensioned to permit removable of the knock-out panel portion by an installer-supplied force or blow.

In some embodiments, the knock-out panel is integrally formed with the two mounting flange portions, is joined to each of the two mounting flange portions with one or more frangible web members, and is floating with respect to the surface. In other embodiments, the knock-out panel is joined directly to the surface with one or more frangible web members.

In some embodiments, the bulkhead panel comprises an extended bottom portion joined to and extending between the two mounting flange portions. This extended bottom portion is rigidly attached to the surface, in some cases by spot welded attachments to the surface at two or more locations. In some of these embodiments, the knock-out panel is joined to the extended bottom portion with one or more frangible web members. In some cases, the bulkhead panel is an elongated sheet bent at or approximately to a right angle along its longest dimension, where one side of the bend forms the extended bottom portion that is attached to the surface.

Other embodiments of the present invention include techniques for constructing an enclosure, e.g., for supporting fiber optic hardware or managing fiber optic cables, or both. One example method begins with providing a base having four edges, the four edges including opposing first and second edges spaced apart in a first direction and opposing third and fourth edges spaced apart in a second direction, and further having a surface extending between the first and second edges in the first direction and between the third and fourth edges in the second direction. A bulkhead panel is formed from a flat elongated sheet by at least partly separating portions of the flat elongated sheet from one another so as to form a knock-out panel portion interposed between two mounting flange portions and joined to each of the two mounting flange portions or to a remaining portion of the flat elongated sheet, or both, with one or more frangible web members. These frangible web members are dimensioned to permit removable of the knock-out panel portion by an installer-supplied force or blow. The sheet is then bent at or approximately to a right angle along its longest dimension, and joined to the surface so that it extends across the surface, with the two mounting flange portions and the knock-out panel extending from the surface.

In some embodiments, joining the bulkhead panel to the surface comprises spot welding the bent sheet to the surface at two or more locations. In some embodiments, forming the bulkhead panel also includes drilling, in each of the mounting flange portions, one or more openings adapted to receive a bulkhead adapter plate fastener.

Of course, the present invention is not limited to the above features. Indeed, those skilled in the art will recognize additional features and advantages upon reading the following detailed description, and upon viewing the accompanying drawings.

DETAILED DESCRIPTION

Figure 1:
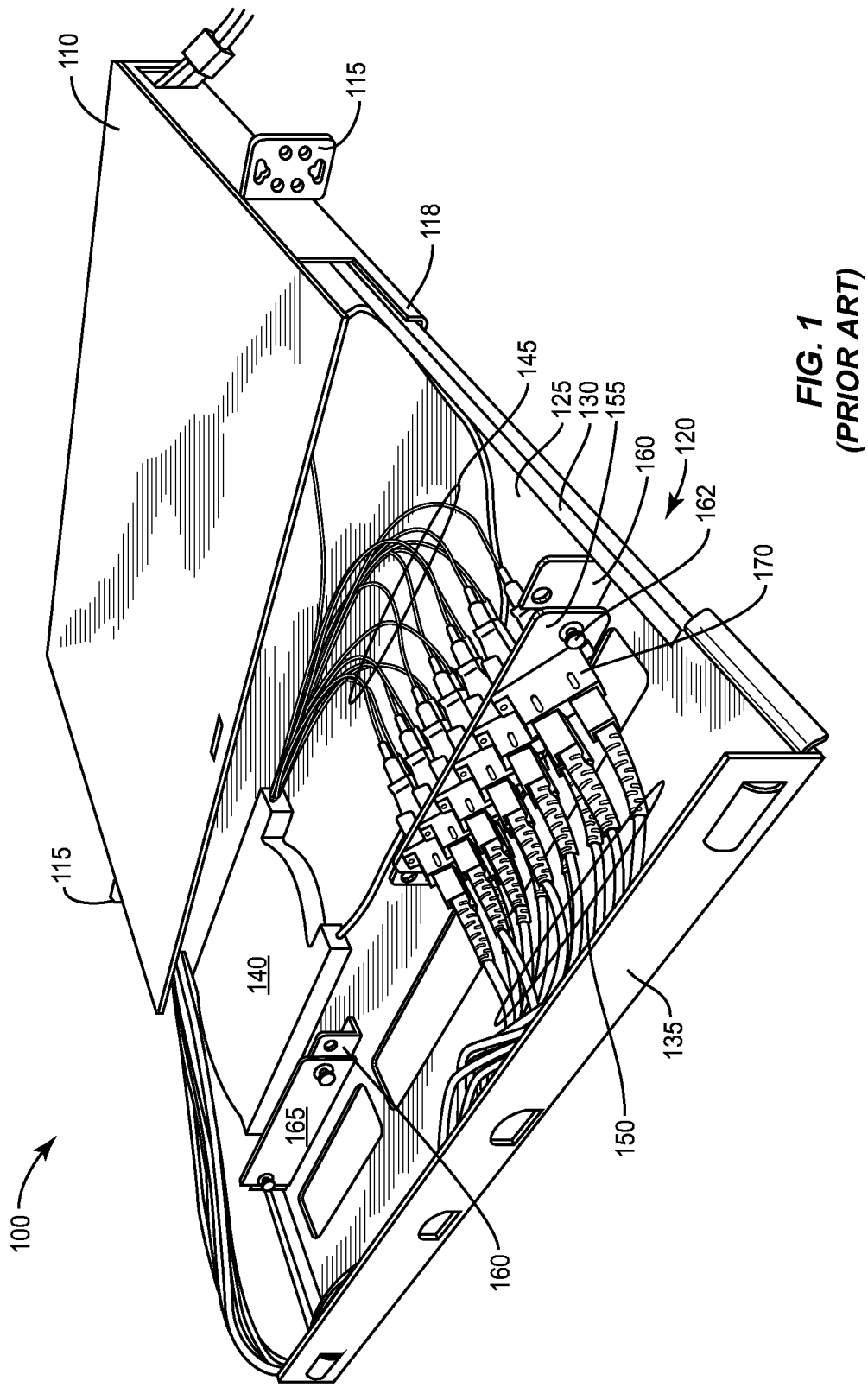
FIG. 1 illustrates a conventional fiber shelf.

FIG. 1 illustrates an example of a typical fiber optic shelf 100. The illustrated shelf includes a surrounding portion 110, which can be mounted to a telecommunications rack using rack mounting flanges 115, and a sliding base portion 120, which slides in and out of enclosure portion 110 on slider rails 118.

The base portion 120 has a flat floor 125 extending between shelf sliders 130 on the floor's left- and right-hand edges and between a front panel 135 and rear panel at the floor's front and rear edges, respectively. (The rear panel is not visible in FIG. 1.) The base portion 120 can support and organize fiber optic components, such as the illustrated optical equipment 140 and optical cable assemblies 145 and 150.

Connections between cable assemblies 145 and 150 are managed and organized with the aid of a bulkhead adapter plate 155, which includes openings (not visible in FIG. 1) dimensioned to receive optical connector adapters 170. Example adapter types include ST, SC, LC, and MT-RJ adapters. In the illustrated apparatus, each of the optical cable assemblies 145 is optically coupled to a corresponding cable assembly 150 through an optical connector adapter 170 mounted on the bulkhead adapter plate 155.

The bulkhead adapter plate 155 is secured to the shelf by means of mounting flanges 160. In the illustrated example, each mounting flange 160 has at least one opening dimensioned to receive a bulkhead adapter plate fastener 162 attached to a bulkhead adapter plate. The mounting flanges 160 are rigidly attached to the floor 125 of the base portion 120. Note that in FIG. 1, the bulkhead adapter plate 155 is not yet secured to the mounting flange 160 at the adapter plate's right-hand end.

Where bulkhead connections are not required, a blank adapter plate may be substituted for an adapter plate configured to hold optical connector adapters. In FIG. 1, a blank adapter plate 165 is installed near the left-hand edge of the base portion 120. Note that an additional blank adapter could be installed in the middle region of the base portion 120, between the blank adapter plate 165 on the left and the fully loaded bulkhead adapter plate 155 on the right.

Figure 2:
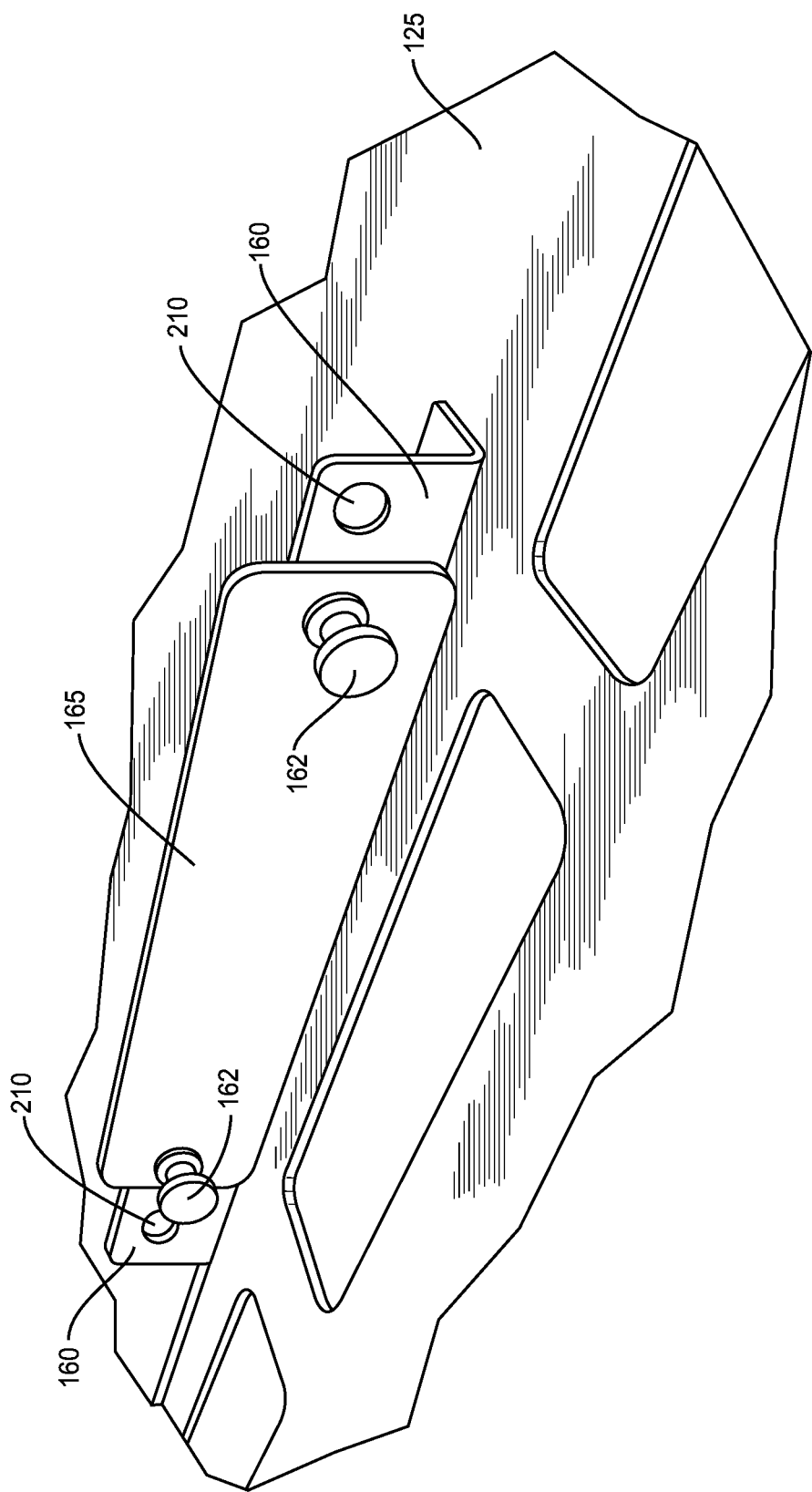
FIG. 2 illustrates the use of a blank adapter plate in a conventional fiber shelf.

FIG. 2 is a close-up view of a portion of a fiber shelf 100, illustrating a blank adapter plate 165 secured to two mounting flanges 160. Each mounting flange 160 has two openings 210 dimensioned to receive an adapter plate fastener 162; in FIG. 2, one opening 210 in each mounting flange is hidden behind blank adapter plate 165. Blank adapter plate 165 is typically made of aluminum, which may be anodized, but could be made from other metals or other materials. The illustrated adapter plate fasteners 162 are plunger type fasteners made from a compliant material such as nylon so that they can be easily snapped into openings 210. However, other fastener types could be used.

One problem with fiber shelf assemblies like those pictured in FIGS. 1 and 2 is that technicians installing the fiber shelf must be equipped with an inventory of both blank adapter plates 165 and bulkhead adapter plates configured for holding optical connector adapters. As discussed above, one or more blank adapter plates 165 may be installed if the space is not needed for loaded bulkhead adapter plates.

Embodiments of the present invention may be used to simplify installation and use of fiber shelves by reducing or eliminating the need to install blank adapter plates. Note that while the specific implementations and techniques detailed herein are directed to fiber shelves, it should be appreciated that these same implementations and techniques may be more generally applied to enclosures for supporting fiber optic hardware or managing fiber optic cables and in which one or more bulkhead panels are needed. A fiber shelf is but one non-limiting example of such an enclosure.

Figure 3:
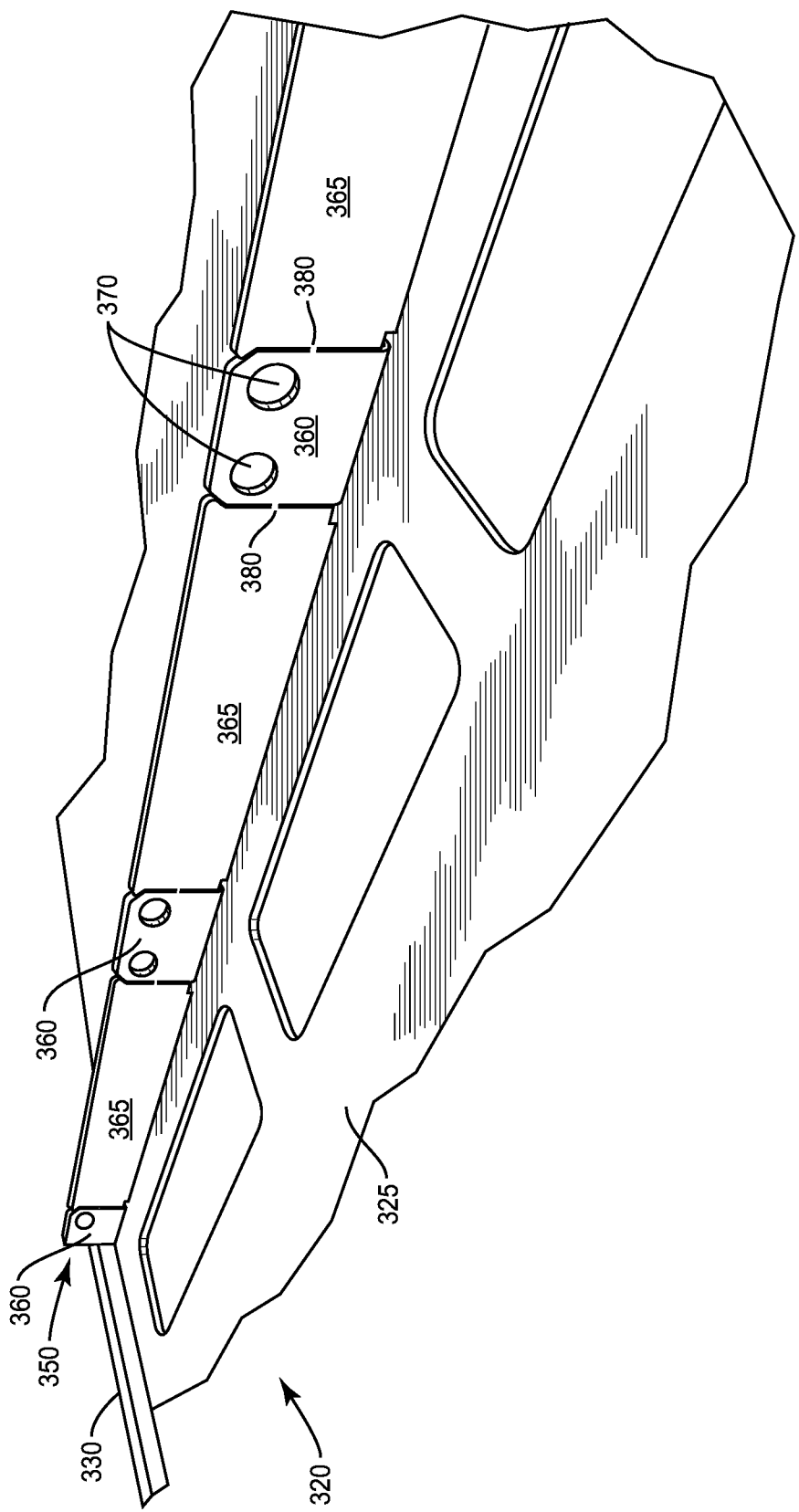
FIG. 3 illustrates a bulkhead panel on a fiber shelf, according to several embodiments of the present invention.

A portion of one embodiment of a fiber shelf according to the present invention is shown in FIG. 3. To simplify the presentation of the present inventive techniques, the illustrated base portion 320 has a general outline like the base portion 120 shown in FIG. 1, and shares several of the features of that shelf. However, it will be appreciated that other configurations are possible.

Base portion 320 has a generally planar floor 325 that extends between opposite front and rear edges spaced apart in one direction and opposite left and right edges spaced apart in a second direction perpendicular to the first direction. In FIG. 3, only the left edge is shown; part of a slider 330 is shown at that edge.

The illustrated fiber shelf also includes a bulkhead panel 350, which extends outward from the floor 325 and extends across the floor 325. In FIG. 3, the bulkhead panel 350 extends all the way to the left edge of the base portion 320. However, it will be appreciated that the bulkhead panel 350 may extend over only a portion of floor 325. Because it is positioned between the front and rear edges of the base portion 320, the bulkhead panel 350 divides the base portion into front and rear sections—this division of the fiber shelf into two or more sections may be useful for organization purposes and/or for limiting access to components and equipment in the rear section(s).

The illustrated bulkhead panel 350 includes several mounting flange portions 360 and knock-out panel portions 365. The mounting flange portions 360 are rigidly attached to or integrally formed with the floor 325, and each includes one or more openings 370. These openings 370 are adapted to receive a bulkhead adapter plate fastener. Each knock-out panel portion 365 is interposed between and integrally formed with two adjacent mounting flange portions 360. The knock-out panel portions 365 are joined to each of their neighboring mounting flange portions 360 with one or more frangible (i.e., breakable) web members 380. These frangible web members 380 are dimensioned to permit removal of a knock-out panel portion 365 with a blow from an installer, e.g., with a small hammer or other tool, or by a twisting force applied by the installer.

Figure 4:
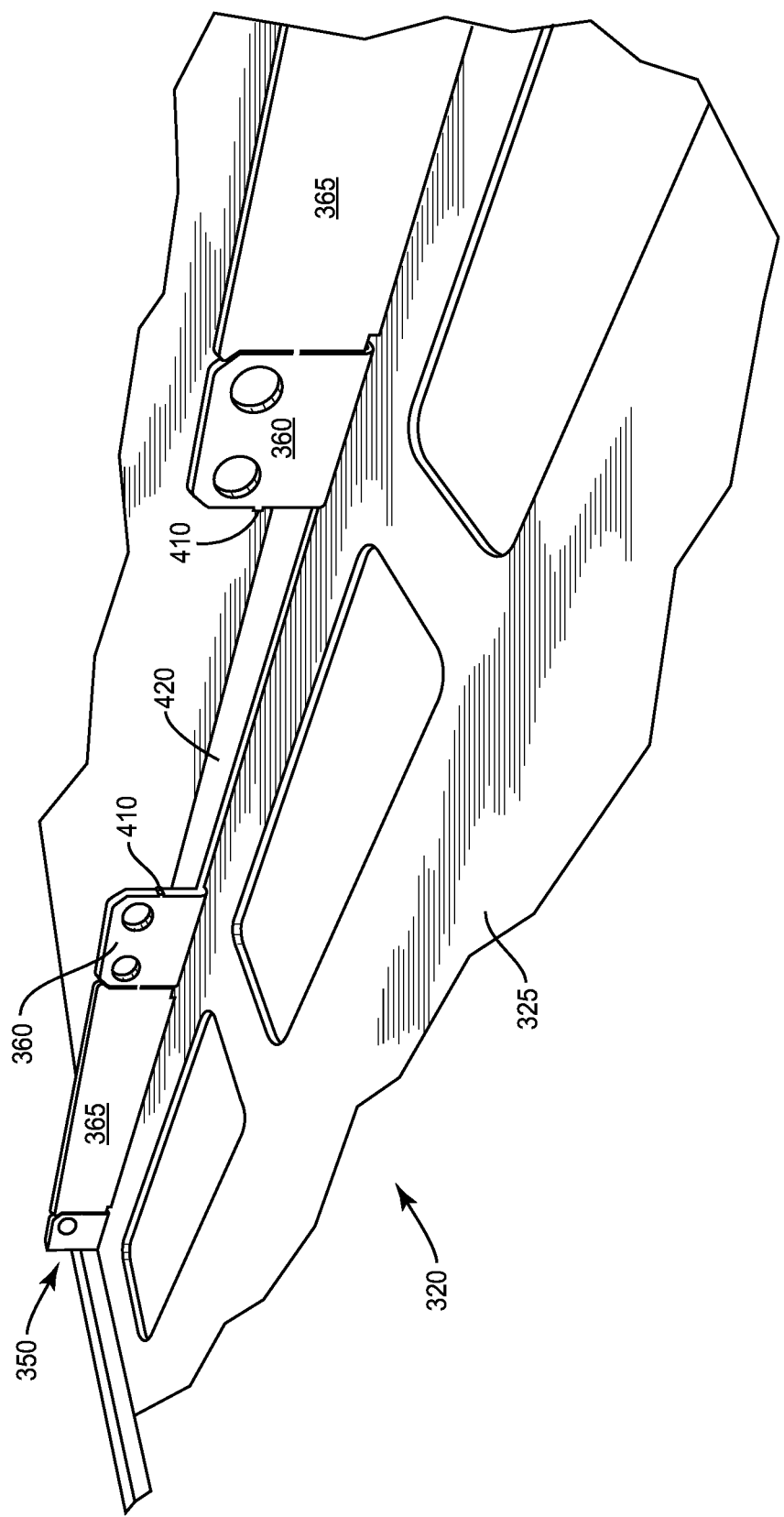
FIG. 4 illustrates the bulkhead panel of FIG. 3, but with a knock-out panel portion removed.

FIG. 4 illustrates the same fiber shelf shown in FIG. 3, but with the center knock-out panel portion 365 removed. Remnants 410 of the frangible web members that previously secured the knock-out panel portion 365 can be seen. Also visible in FIG. 4 is an extended bottom portion 420 of the bulkhead panel 350; this extended bottom portion, which is rigidly attached to the floor 325, runs behind the length of the bulkhead panel 350 and joins to the mounting flange portions 360. In some embodiments, the extended bottom portion 420 is spot welded to the floor 325 at two or more locations.

In the example embodiment shown in FIGS. 3 and 4, only a single frangible web member 380 connects each flange portion 360 to a neighboring knock-out panel 365. Furthermore, these frangible web members 380 are aligned with one another in that each is approximately the same distance from the floor. Because the knock-out panel portion 365 is floating with respect to the floor, the knock-out panel portion 365 can be removed with a twisting action, rather than with a blow from a hammer or other tool. While the alignment of the frangible web members 380 with one another facilitates this twisting, it will be appreciated that this alignment is not strictly necessary. Likewise, other spacings of the frangible web members 380 from the floor may be used.

In other embodiments, the knock-out panel portion 365 can instead be joined to each flange portion 360 with more than one frangible web member, but this approach may make removing the knock-out panel 365 more difficult. In still other embodiments, the knock-out panel portion 365 can be joined to the floor, or to a horizontal portion that is rigidly attached to the floor, with one or more frangible web members. With this approach, the knock-out panel portion 365 can again be removed by twisting the knock-out panel portion 365 so as to break the frangible web member. In yet other embodiments, the knock-out panel portion 365 may be joined to the flange portions 360 as well as to the floor (either directly or indirectly), with frangible web members. Once again, however, this approach may make it more difficult to remove the knock-out panel portion 365.

Figure 5:
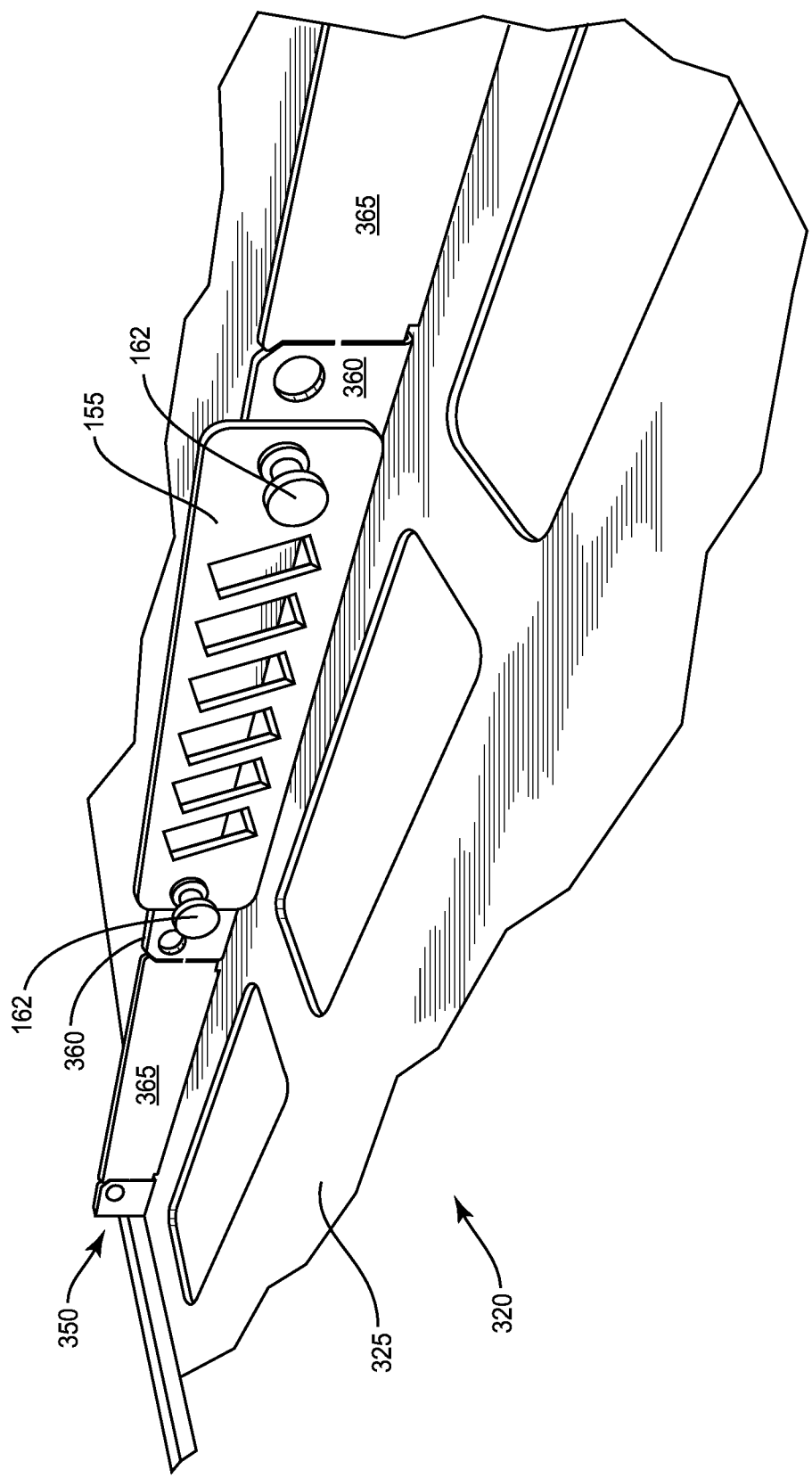
FIG. 5 illustrates the bulkhead panel of FIG. 4, with an adapter plate installed in place of the knock-out panel portion.
Figure 6:
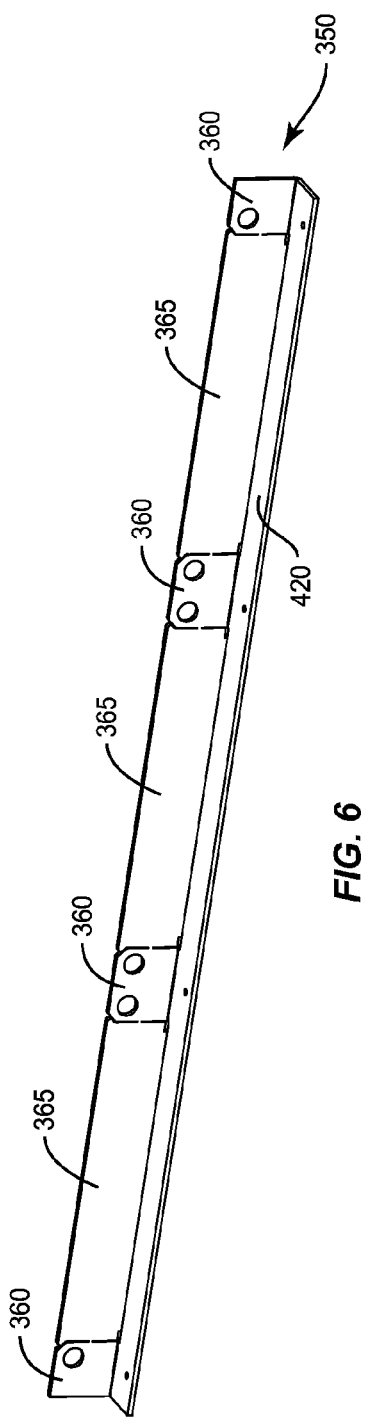
FIGS. 6-11 are views of an example bulkhead panel according to some embodiments of the present invention.
Figure 7:
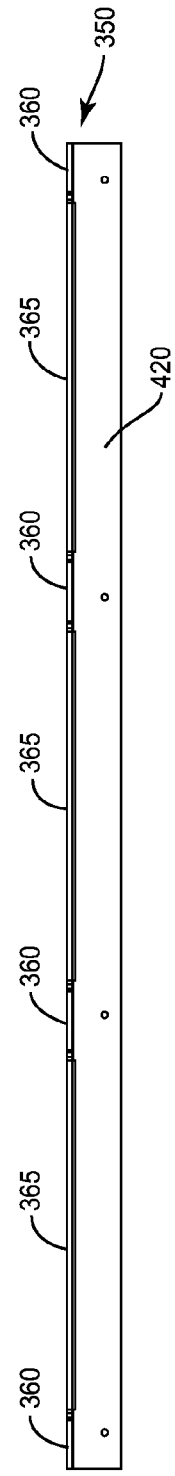
Figure 8:
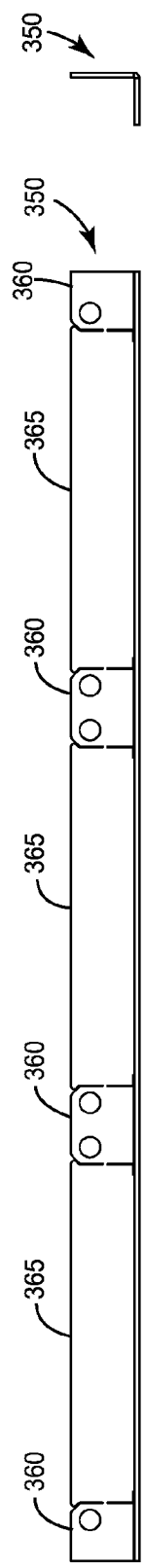
Figure 9:

FIG. 5 is another view of the same fiber shelf portion shown in FIGS. 3 and 4, but in this case with an adapter plate 155 secured in the position formerly occupied by a knock-out panel portion 365. In this view, connector adapters have not yet been mounted on adapter plate 155.

Figure 11:
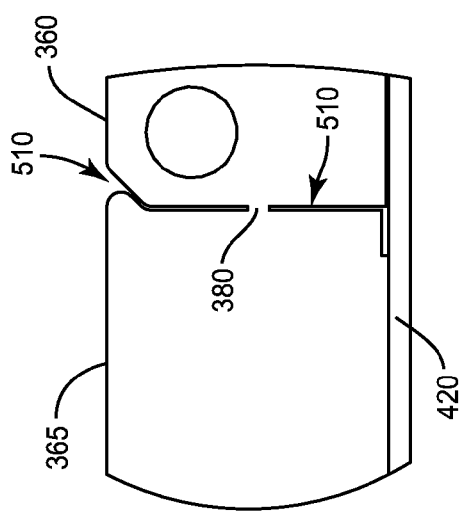
Figure 10:
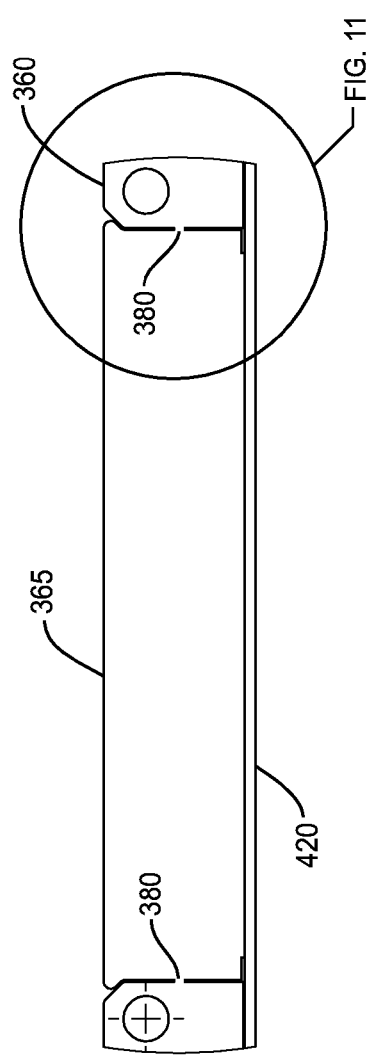

FIGS. 6, 7, 8, and 9 provide several views of bulkhead panel 350. In this example embodiment, the bulkhead panel is an elongated sheet bent at or approximately to a right angle along its longest dimension, giving the bulkhead panel the general shape of an angle iron, i.e., having an "L"-shaped cross section. FIGS. 10 and 11 illustrate details of the formation of a mounting flange portion 360 and the frangible web member 380 connecting a knock-out panel portion 365 to the mounting flange portion 360. Cut-outs 510 separate the mounting flange portion 360 from the knock-out panel portion 365, except for a small connection maintained by the frangible web member 380. These cut-outs 510 also separate the knock-out panel portions 365 from the extended bottom portion 420 so that the knock-out panel portions 365 are floating with respect to the extended bottom portion 420 and from the floor of the fiber shelf when the bulkhead panel 350 is installed.

Again, it should be noted that FIGS. 6, 7, 8, and 9 illustrate an embodiment in which the knock-out panel portions 365 are joined to each of their adjacent mounting flange portions 360 with a single frangible web member 380. In other embodiments, the knock-out panel portions 365 may be joined to each adjacent mounting flange portion 360 with more than one frangible web member 380, and/or joined to the extended bottom portion 420 with one or more frangible web members 380.

Figure 12:
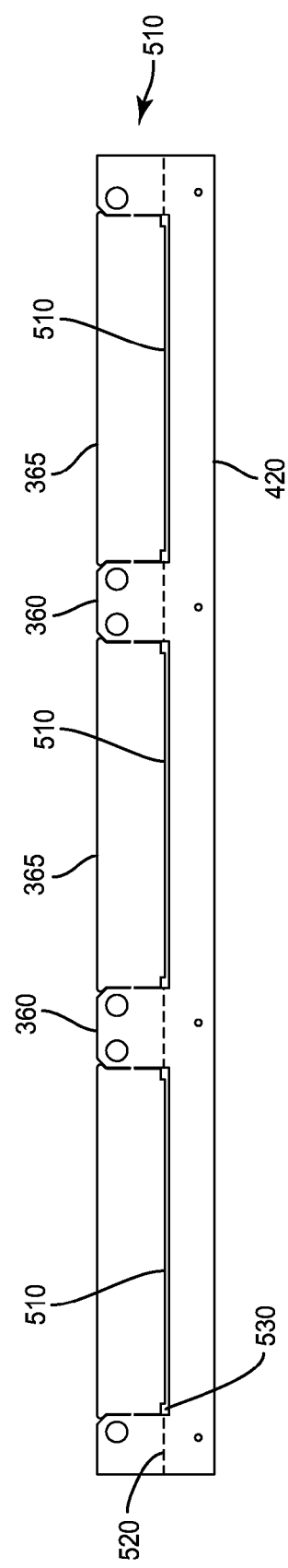
FIG. 12 is a pattern for forming a bulkhead panel according to several embodiments of the present invention.

FIG. 12 illustrates a view of a bulkhead panel portion during its construction, i.e., before it has been bent along its long dimension, into an L-shape. In this view it can be seen that cut-outs 510 extend along the length of each knock-out panel portion 365, thus separating the knock-out panel portions 356 from the extended bottom portion 420. In the example embodiment illustrated here, the knock-out panel portions 365 are completely separated from the extended bottom portion 420. In other embodiments, however, the knock-out panel portions 365 may be connected to the extended bottom portion 420 by one or more frangible web members, as well. In either case, however, the knock-out panel portions 356 are effectively floating with respect to the bottom portion 420.

FIG. 12 illustrates a fold line 520, which indicates where the flat panel can be bent into an L-shape. Also visible in FIG. 12 are relief cut-outs 530 between the knock-out panel portions 365 and mounting flange portions 360. These relief cut-outs 530 ensure that space is maintained between the knock-out panel portions 365 and the remainder of the structure after the flat panel is bent. This can reduce the chance that powder coating or other surface treatment of the bent panel forms an undesired bridge between the knock-out panel portions 365 and the remainder of the structure. These bridges could make the knock-out panel portions 365 more difficult to remove.

Worth noting in FIG. 12 is that the portions of the cut-outs 510 that extend along the length of the bulkhead panel 350 are at least partly below the fold line 520, i.e., on the extended bottom portion side of the panel. As a result, when the flat panel is bent into an L-shape and placed on a flat surface with the extended bottom portion 420 sitting on the flat surface, the lowest part of each knock-out panel portion 365 extends below the top surface of the extended bottom portion 420. This can be seen in FIGS. 3, 4, 5, 8, 10, and 11. An advantage of this approach is that fibers and fiber cables are less likely to become caught or to get pinched by the small gap formed by the cut-out 510, as fibers or cables sliding just across the top surface of the extended bottom portion 420 will encounter a wall formed by the knock-out panel, rather than a cut-out gap.

From the views of bulkhead panel 350 given in FIGS. 6-12, it should be appreciated that the bulkhead panel 360 may be formed from a flat elongated sheet by at least partly separating portions of the flat elongated sheet from one another so as to form one or more knock-out panel portions, where each knock-out panel portion is interposed between two mounting flange portions and joined to each of the two mounting flange portions and/or to the remaining portion of the flat elongated sheet with the one or more frangible web members. This separation may be performed using laser cutting for example, but other techniques, such as stamping or punching might be used. As detailed above, the frangible web members are dimensioned to permit removal of the knock-out panel portion by an installer-supplied force or blow. The flat elongated sheet can then be bent at or approximately to a right angle along its longest dimension.

Figure 13:
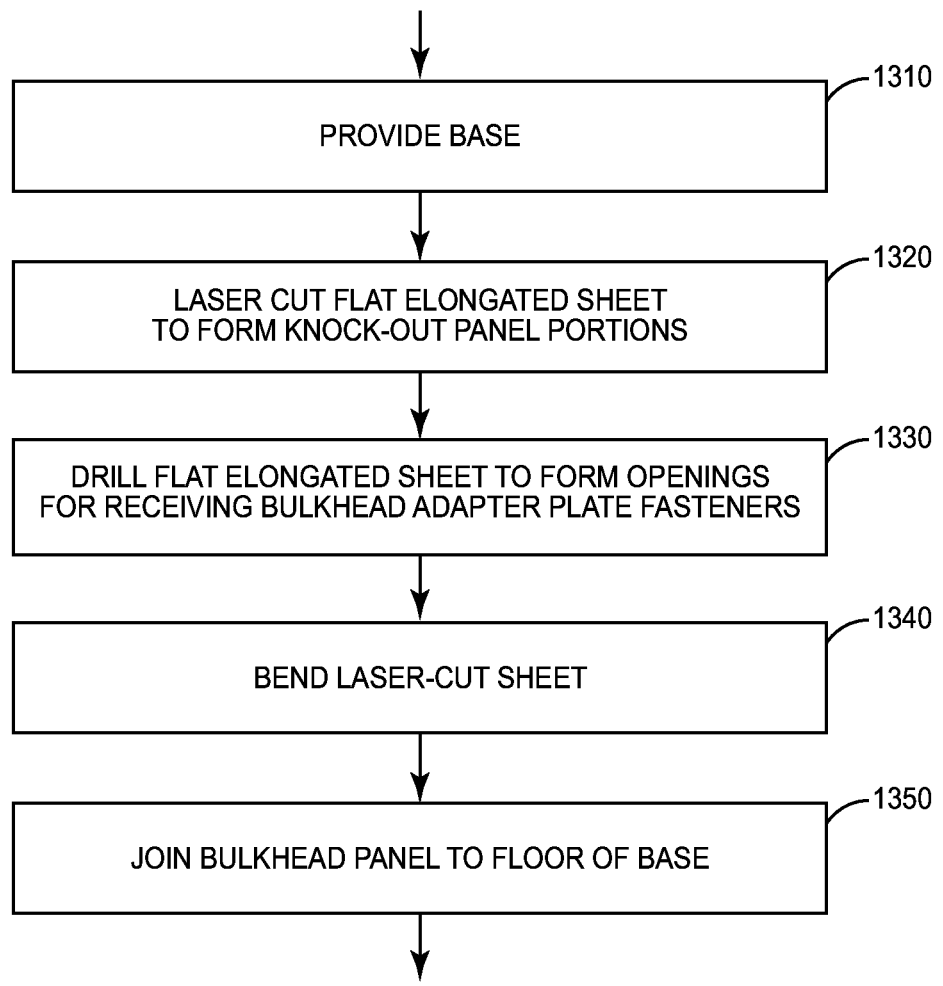
FIG. 13 is a process flow diagram illustrating an example method for constructing a fiber shelf.

FIG. 13 is a process flow diagram illustrating a more complete process for constructing a shelf. As shown at block 1310, a base having four edges is provided, the four edges including opposite front and rear edges spaced apart in a first direction and opposite left and right edges spaced apart in a second direction. The base further includes a floor extending between the front and rear edges in the first direction and between the left and right edges in the second direction.

As shown at block 1320, a bulkhead panel is then formed from a flat elongated sheet as discussed above, e.g., by laser cutting the flat elongated sheet so as to form a knock-out panel portion interposed between two mounting flange portions and joined to each of the two mounting flange portions only with one or more frangible web members dimensioned to permit removal of the knock-out panel portion by an installer-supplied force or blow. In some embodiments, as shown at block 1330, forming the bulkhead panel further comprises drilling one or more openings in each of the mounting flange portions, where the openings are adapted to receive a bulkhead adapter plate fastener.

As shown at block 1340, the laser-cut flat elongated sheet is bent at or approximately to a right angle along its longest dimension. The bent bulkhead panel is then joined to the floor, as shown at block 1350, so that it extends across the floor in the second direction, at a position between the front and rear edges. In some cases this is done by spot welding the bulkhead panel to the floor at two or more locations. Of course, other techniques may be used to join the bulkhead panel to the floor, such as using rivets or screws.

While specific examples of a fiber shelf and a bulkhead panel having knock-out panels are illustrated in the attached drawings and described in detail above, it will be appreciated that many variants of these shelves and the disclosed techniques are possible. Further, as noted above, the techniques and implementations detailed herein are not limited in their application to fiber shelves, but may be advantageously applied to other enclosures. Some of these enclosures may be configured for hanging on a wall or other surface, rather than for mounting in a rack. In such enclosures, it will be appreciated that the term "floor," as used herein, should be understood to refer to an interior surface of the enclosure. Likewise, references herein to "front" and "rear" edges or "left" and "right" edges should not be understood to limit the implementation of the inventive techniques described herein to any particular orientation of the bulkhead panel within the enclosure.

Thus, the foregoing description and the accompanying drawings represent non-limiting examples of the methods and apparatus taught herein. The present invention is not limited by the foregoing description and accompanying drawings, but is instead limited only by the following claims and their legal equivalents.

What is claimed is:

1. An enclosure for supporting fiber optic hardware or managing fiber optic cables, or both, the enclosure comprising:
    a base having four edges, the four edges including opposing first and second edges spaced apart in a first direction and opposing third and fourth edges spaced apart in a second direction, and further having a surface extending between the first and second edges in the first direction and between the third and fourth edges in the second direction; and
    a bulkhead panel extending outward from the surface and extending across the surface, the bulkhead panel comprising
        at least two mounting flange portions rigidly attached to or integrally formed with the surface, each mounting flange comprising one or more openings adapted to receive a bulkhead adapter plate fastener, and
        a knock-out panel portion interposed between two of the mounting flange portions, wherein the knock-out panel portion is joined to (i) the surface via one or more frangible web members, or (ii) to each of the two mounting flange portions with one or more frangible web members, or (iii) both, wherein the one or more frangible web members are dimensioned to permit removal of the knock-out panel portion by an installer-supplied force or blow.

2. The enclosure of claim 1, wherein said knock-out panel is integrally formed with the two mounting flange portions, is joined to each of the two mounting flange portions with one or more frangible web members, and is floating with respect to the surface.

3. The enclosure of claim 2, wherein said knock-out panel is joined to each of the two mounting flange portions with a single frangible web member.

4. The enclosure of claim 3, wherein the frangible web members joining the knock-out panel to the two mounting flange portions are positioned at approximately the same distance from the surface.

5. The enclosure of claim 4, wherein the two mounting flange portions extend to a height from the surface and wherein said same distance is approximately one-half said height.

6. The enclosure of claim 1, wherein said knock-out panel is joined directly to the surface with one or more frangible web members.

7. The enclosure of claim 1, wherein the bulkhead panel further comprises an extended bottom portion joined to and extending between the two mounting flange portions, wherein the extended bottom portion is rigidly attached to the surface.

8. The enclosure of claim 7, wherein the knock-out panel is joined to the extended bottom portion with one or more frangible web members.

9. The enclosure of claim 7, wherein the extended bottom portion is spot welded to the surface at two or more locations.

10. The enclosure of claim 9, wherein the bulkhead panel comprises an elongated sheet bent at or approximately to a right angle along its longest dimension.

11. A method for constructing a enclosure, the method comprising:
    providing a base having four edges, the four edges including opposing first and second edges spaced apart in a first direction and opposing third and fourth edges spaced apart in a second direction, and further having a surface extending between the first and second edges in the first direction and between the third and fourth edges in the second direction;
    forming a bulkhead panel from a flat elongated sheet by at least partly separating portions of the flat elongated sheet from one another so as to form a knock-out panel portion interposed between two mounting flange portions and joined to each of the two mounting flange portions or to a remainder portion of the flat elongated sheet with one or more frangible web members dimensioned to permit removal of the knock-out panel portion by an installer-supplied force or blow, and bending the flat elongated sheet at or approximately to a right angle along its longest dimension; and
    joining the bent elongated sheet to the surface so that it extends across the surface, with the mounting flange portions and the knock-out panel portion extending from the surface.

12. The method of claim 11, wherein forming the bulkhead panel comprises laser cutting the flat elongated sheet to at least partly separate the portions from one another.

13. The method of claim 11, wherein forming the bulkhead panel further comprises drilling, in each of the mounting flange portions, one or more openings adapted to receive a bulkhead adapter plate fastener.

14. The method of claim 11, wherein joining the bulkhead panel to the surface comprises spot welding the bulkhead panel to the surface at two or more locations.

* * * * *